United States Patent
Rossi et al.

(10) Patent No.: US 9,273,846 B1
(45) Date of Patent: Mar. 1, 2016

(54) APPARATUS FOR PRODUCING PATTERNED ILLUMINATION INCLUDING AT LEAST ONE ARRAY OF LIGHT SOURCES AND AT LEAST ONE ARRAY OF MICROLENSES

(71) Applicant: Heptagon Micro Optics Pte. Ltd., Singapore (SG)

(72) Inventors: Markus Rossi, Jona (CH); Hans Peter Herzig, Neuchâtel (CH); Philipp Müller, Oberrieden (CH); Ali Naqavi, Neuchâtel (CH); Daniel Infante Gómez, Neuchâtel (CH); Moshe Doron, San Francisco, CA (US); Matthias Gloor, Boswil (CH); Alireza Yasan, San Jose, CA (US)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days.

(21) Appl. No.: 14/608,408

(22) Filed: Jan. 29, 2015

(51) Int. Cl.
*F21V 5/00* (2015.01)
*F21V 5/02* (2006.01)
*F21Y 101/02* (2006.01)

(52) U.S. Cl.
CPC . *F21V 5/007* (2013.01); *F21V 5/02* (2013.01); *F21Y 2101/02* (2013.01); *F21Y 2101/025* (2013.01)

(58) Field of Classification Search
CPC ......... F21V 5/004; F21V 5/007; F21V 5/002; G02B 19/0066; G02B 19/0061
See application file for complete search history.

(56) References Cited

U.S. PATENT DOCUMENTS 7,970,177 B2   6/2011   St. Hilaire et al.
8,009,358 B2 *   8/2011   Zalevsky et al. ............. 359/618
(Continued)

FOREIGN PATENT DOCUMENTS

WO   2014/083485   6/2014

OTHER PUBLICATIONS

Jahns, J. et al., "The Lau Effect (A diffraction Experiment with Incoherent Illumination)", *Optics Communications*, 28(3):263-267 (1979).

(Continued)

*Primary Examiner* — Robert May
(74) *Attorney, Agent, or Firm* — Fish & Richardson P.C.

(57) ABSTRACT

An apparatus for producing structured light comprises a first optical arrangement which comprises a microlens array comprising a multitude of transmissive or reflective microlenses which are regularly arranged at a lens pitch P and an illumination unit for illuminating the microlens array. The illumination unit comprises an array of light sources for emitting light of a wavelength L each and having an aperture each, wherein the apertures are located in a common emission plane which is located at a distance D from the microlens array. For the lens pitch P, the distance D and the wavelength L, the following equation applies $$P^2 = 2LD/N,$$

Figure 8:
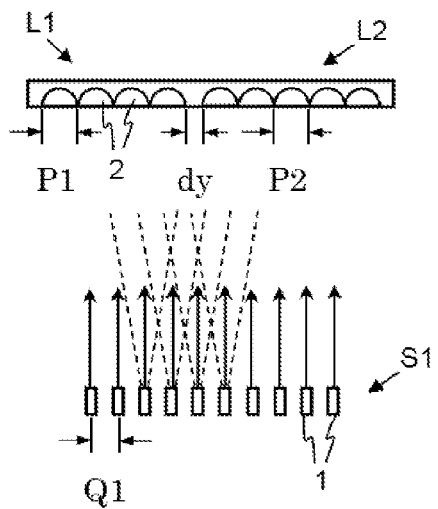

wherein N is an integer with $N \geq 1$. High-contrast high-intensity light patterns can be produced.

30 Claims, 5 Drawing Sheets

(56) References Cited

U.S. PATENT DOCUMENTS

| | | | |
|---|---|---|---|
| 8,320,621 B2* | 11/2012 | McEldowney | 382/103 |
| 2010/0118123 A1 | 5/2010 | Freedman et al. | |
| 2012/0038986 A1 | 2/2012 | Pesach | |
| 2012/0257191 A1* | 10/2012 | Deckenbach et al. | 356/71 |
| 2013/0038941 A1 | 2/2013 | Pesach et al. | |
| 2013/0170203 A1* | 7/2013 | Cheng et al. | 362/235 |
| 2015/0036114 A1* | 2/2015 | Schadt et al. | 355/67 |

OTHER PUBLICATIONS

Kolodziejczyk, A., et al., "Lens-based theory of the Lau effect", *J. Opt. Soc. Am. A.*, 17(4):724-728 (2000).

Som, S.C. et al., "The Generalised Lau Effect", *Journal of Modern Optics*, 37(7):1215-1225 (1990).

* cited by examiner

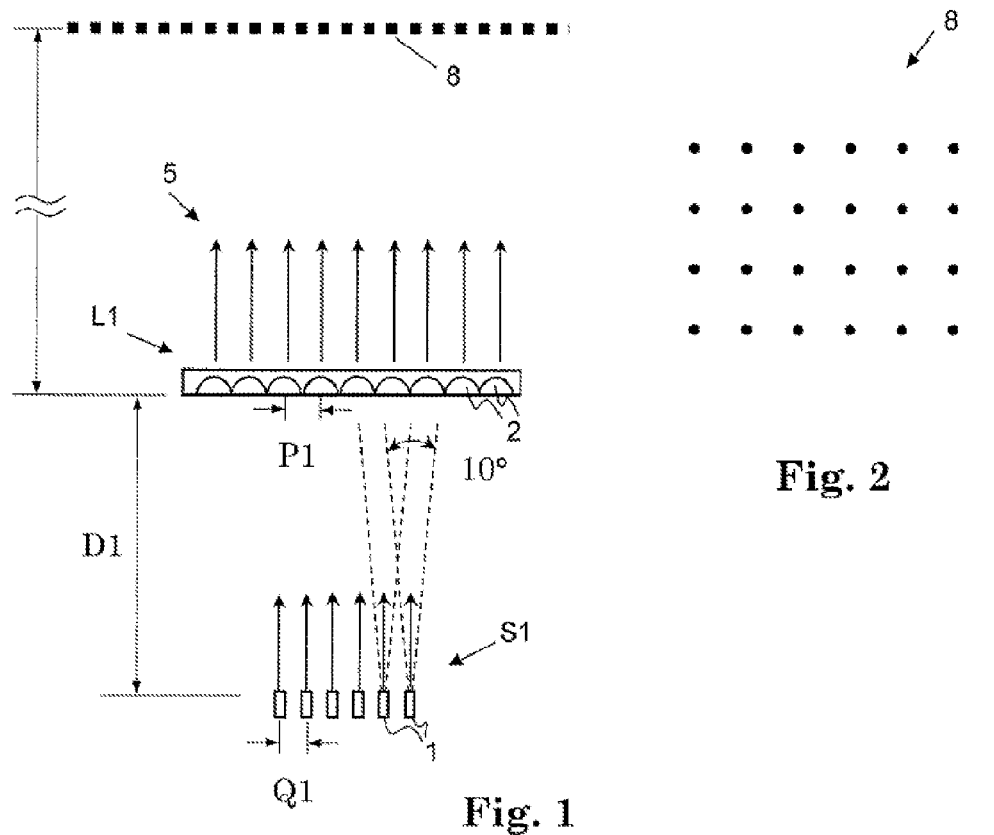
Fig. 2
Fig. 1
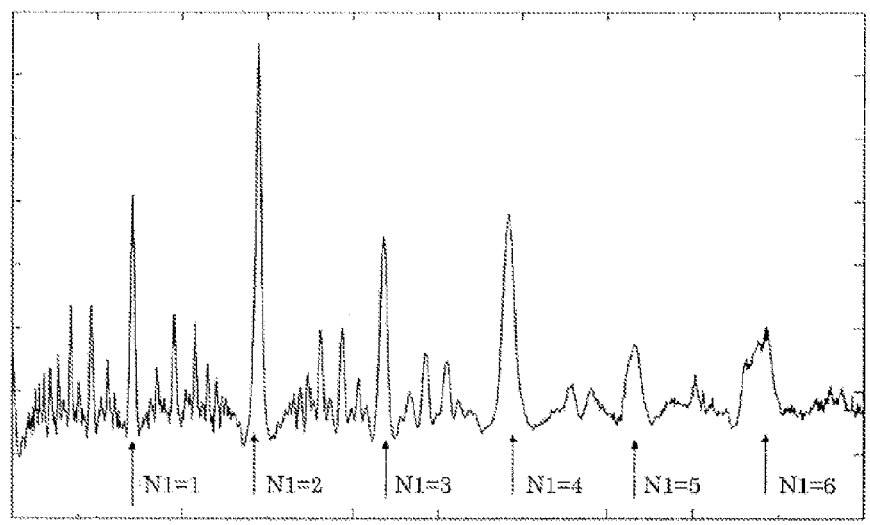
Fig. 3

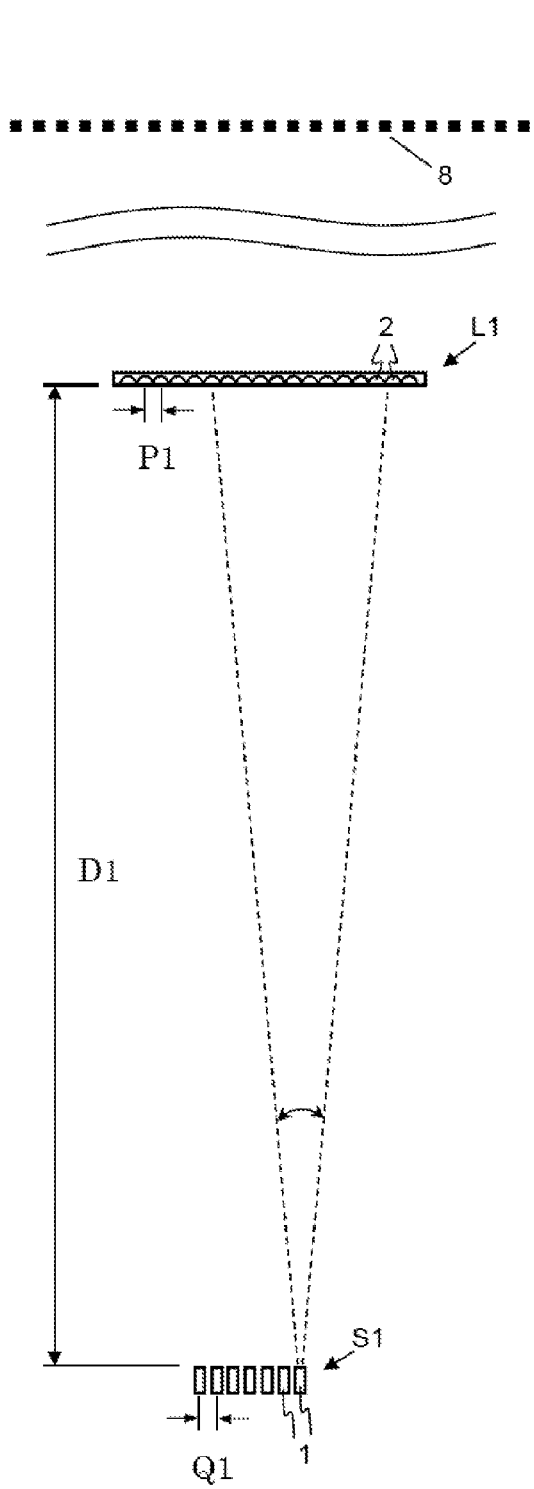
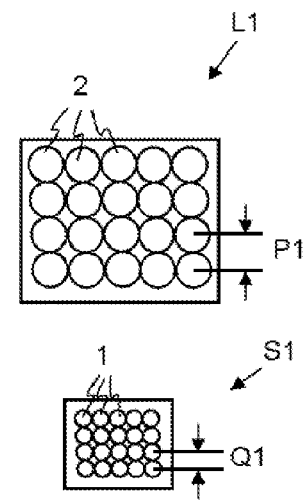
Fig. 5
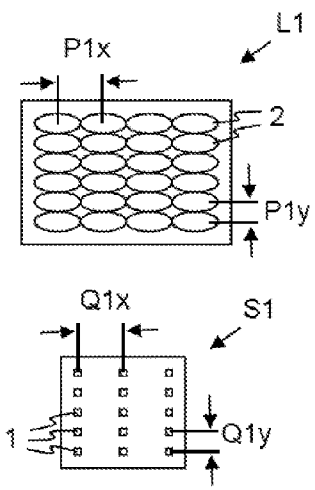
Fig. 6
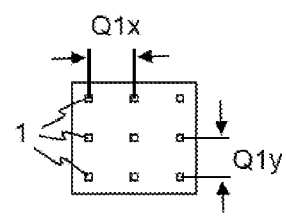
Fig. 7
Fig. 4

APPARATUS FOR PRODUCING PATTERNED ILLUMINATION INCLUDING AT LEAST ONE ARRAY OF LIGHT SOURCES AND AT LEAST ONE ARRAY OF MICROLENSES

The disclosure relates to the field of optics and in particular to the generation of structured light and patterned illumination. It relates to corresponding apparatuses.

DEFINITION OF TERMS

"Active optical component": A light sensing or a light emitting component. E.g., a photodiode, an image sensor, an LED, an OLED, a laser chip. An active optical component can be present as a bare die or in a package, i.e. as a packaged component.

"Passive optical component": An optical component redirecting light by refraction and/or diffraction and/or (internal and/or external) reflection such as a lens, a prism, a mirror (plane or curved), or an optical system, wherein an optical system is a collection of such optical components possibly also comprising mechanical elements such as aperture stops, image screens, holders.

"Replication": A technique by means of which a given structure or a negative thereof is reproduced. E.g., etching, embossing (imprinting), casting, molding.

"Light": Most generally electromagnetic radiation; more particularly electromagnetic radiation of the infrared, visible or ultraviolet portion of the electromagnetic spectrum.

Structured light can be used, e.g., in applications where distances to objects present in a scene shall be determined Therein, a light pattern created in the scene by the structured light makes possible to distinguish bodies according to their distance from the apparatus emitting the structured light. Game consoles, for example, may comprise a pattern projector for illuminating a scene with structured light in which a player is present, while the so-illuminated scene is imaged and analyzed so as to achieve a 3D mapping of the scene, also referred to as depth mapping.

Structured light is often also referred to as patterned light, such that these two terms are, in the present patent application, used interchangeably. The term "structured light" is mostly used when the light is evaluated for determining distances by means of triangulation techniques. "Patterned light", on the other hand, is mostly used when the light is evaluated for determining distances using stereovision, wherein the light is in this case typically used for contrast enhancement.

Some examples of related art are discussed briefly below.

U.S. Pat. No. 7,970,177 B2, for example, describes an apparatus for distance calculation based on the generation of structured light using diffractive optical elements.

US 2012/038986 A1 describes a pattern projector using diffractive optical elements.

US 2010/118123 A1 describes an apparatus for mapping an object including an illumination assembly which includes a single transparency containing a fixed pattern of spots. Therein, a light source transilluminates the single transparency with optical radiation so as to project the pattern onto the object.

US 2013/038941A1 describes an optical apparatus including a matrix of light sources arranged on a substrate with a predetermined, uniform spacing between the light sources. A microlens array of the same uniform spacing is arranged close to the microlens array, so as to collimate the light emitted from the light sources and establish a beam homogenizer.

WO 2014/083485A1 describes a laser device for projecting a structured light pattern onto a scene comprising several arrays of semiconductor lasers.

One object of the present disclosure is to describe an apparatus for producing structured light which is particularly shallow in the direction parallel to the direction of light emission.

Another object of the disclosure is to describe an apparatus for producing structured light which requires a particularly small number of constituents only.

Another object of the disclosure is to describe an apparatus for producing structured light which provides a good contrast over a particularly large range of distances from the apparatus.

Another object of the disclosure is to describe an apparatus for producing structured light which can create particularly high contrast patterns.

Another object of the disclosure is to describe an apparatus for producing structured light of particularly high intensity, in particular when considered relative to the intensity of the light initially produced within the apparatus.

Another object of the disclosure is to describe an apparatus for producing structured light which can produce relatively simple light patterns.

Another object of the disclosure is to describe an apparatus for producing structured light which can produce relatively complicated light patterns.

Another object of the disclosure is to describe an apparatus for producing structured light, which can be manufactured with relatively loose alignment tolerances.

Another object of the disclosure is to describe an apparatus for producing structured light, which has a good manufacturability.

Another object of the disclosure is to describe an apparatus for producing structured light, which can be manufactured with relatively high yield.

Further objects and various advantages emerge from the description and embodiments below.

One or more of the objects are at least partially achieved by apparatuses and methods according to the subject matter described in this disclosure.

The present inventors have discovered that for certain selections of a lens pitch P of a microlens array (MLA) and of a distance D of the MLA to a light source illuminating the MLA—which we want to refer to as "illumination unit"—, a contrast in structured light thereby produced is particularly strong, wherein the selection also depends on the wavelength of the light emitted by the illumination unit. Accordingly, in those specific cases, patterns of particularly high contrast can be projected onto a scene.

The inventor's findings show some analogies to an optical effect discovered by Ernst Lau in 1948 ("Lau Effect"). The Lau Effect is described, e.g., in a paper by J. Jahns and A. W. Lohmann published in March 1979 in "OPTICS COMMUNICATIONS", Volume 28, number 3, titled "THE LAU EFFECT (A DIFFRACTION EXPERIMENT WITHIN COHERENT ILLUMINATION)". Lau's original experimental setup comprises an extended white light source illuminating a first grating behind which another grating is present which has the same slit separation as the first grating, and finally a converging lens images the light exiting the second grating into an observation plane. Lau has been able to observe fringe patterns for the case that the following equation has been met:

$$z0 = n\, d^2/2\lambda, (n=1,2,3,4,\ldots) \text{ wherein}$$

z0 is the distance between the two gratings, d is the grating constant of the gratings (slit separation), and λ designates a wavelength emitted by the light source, namely the wavelength of the light forming the observed fringe pattern.

Despite the significant differences from the present invention, understanding the Lau Effect can aid, to some extent, in understanding the functioning of the apparatus and techniques of the present invention.

Another, but rather well-known, optical effect is an effect in coherent optics called Talbot Effect (or "Talbot self-imaging") discovered in 1836 by Henry Fox Talbot. The Talbot Effect is also described in the above-mentioned paper by J. Jahns and A. W. Lohmann. While the Lau Effect and the Talbot Effect can both be considered to relate to self-imaging of a grating, they differ at least in that Talbot described using a monochromatic point light source (instead of the extended white light source employed by Lau), and in that Lau places two gratings behind one another, whereas Talbot uses a single grating only.

Talbot had discovered that behind the grating illuminated by the monochromatic light source, interference patterns are observable in planes which are aligned parallel to the grating and which are at specific distances from the grating. Those specific distances behind the grating are $$2d^2/\lambda,$$

and integer multiples thereof, wherein d designates the grating constant of the grating and $\lambda$ the wavelength of the monochromatic light source.

The present inventors discovered that particularly high contrast can be achieved if apertures of light sources of the illumination unit are in a common plane, which we refer to as an emission plane.

The present inventors also have recognized that particularly high contrast can be achieved if the illumination unit is a periodic light source.

A corresponding apparatus proposed by the inventors can be described as an apparatus for producing structured light, which comprises a first optical arrangement comprising:
  a microlens array comprising a multitude of microlenses which are regularly arranged at a lens pitch P, wherein the microlenses can be transmissive microlenses or reflective microlenses;
  an illumination unit for illuminating the microlens array; wherein the illumination unit comprises an array of light sources (LSA) for emitting light of a wavelength L each and having an aperture each. The apertures are located in a common plane (the emission plane), and the emission plane is located at a distance D from the microlens array. The special condition for the particularly high contrast in the produced structured light (and patterned illumination) interlinks the lens pitch P, the distance D and the wavelength L as follows:

$$P^2 = 2LD/N,$$

wherein N is an integer with $N \geq 1$.

For small N, e.g., $N \leq 8$, in particular $N \leq 5$, the distance D is relatively small such that the first optical arrangement (and thus often also the apparatus) can be rather shallow. As further discovered by the present inventors, the contrast achievable is apparently very high for such low N. In some experiments, N in the range of 1 to 4 can provide very good contrast, in particular $N=2$.

The apparatus can also be considered an apparatus for producing patterned illumination.

The apertures do not need to be separable from the light sources. E.g., for a semiconductor laser, the active area from which the light is emitted establishes the aperture.

The apertures are mentioned mainly for the reason that by them, the location of the light emission is defined and thus, they make possible to define the distance D from the MLA.

Usually, the emission plane is aligned parallel to the microlens array.

The wavelength L is a wavelength of light emitted by the light sources. In case the light sources are lasers, it is simply the (medium) wavelength of the emitted laser radiation. In case of light sources emitting a mixture of wavelengths, wavelength L can, in principle, be any of the emitted wavelengths. But in any event, a particularly good contrast is present for those wavelengths L for which the above-cited equation is fulfilled, while other wavelengths superimpose patterns created by wavelengths L—which usually results in a blurring of the patterns at wavelengths L. Therefore, wavelengths L will typically be a peak wavelength in a wavelengths spectrum of the respective light source.

Wavelengths L may in particular be in an invisible range of light, particular in the infrared light range.

Typically, all the microlenses of the multitude of microlenses are congeneric microlenses.

Lens pitches P are typically between 5 μm and 250 μm, more particularly between 10 μm and 150 μm.

Typically, all the light sources of the array of light sources are congeneric light sources.

As described above, the microlenses can be transmissive or reflective.

Transmissive microlenses are transparent to at least a portion of the light emitted from the illumination unit; accordingly, light emitted from the illumination unit may propagate, at least in part, through the microlenses. The transmissive microlenses can be diffractive and/or refractive microlenses. For example, the transmissive microlenses may be athermalized microlenses or other hybrid lenses.

Reflective microlenses reflect at least a portion of the light emitted from the illumination unit. They can also be understood as structured (and thus not-flat) micromirrors, e.g., curved micromirrors. In case of reflective microlenses, the microlens array (MLA) can thus be considered a micromirror array. The microlenses/micromirrors are, however, usually not individually movable and typically in a fixed position with respect to the rest of the microlens array/micromirror array. Each of the reflective microlenses may have a surface which is smooth and curved (like a refractive lens) and/or may be structured with diffractive structures (like a transparent diffractive lens).

In typical embodiments, the microlenses are transmissive refractive microlenses.

In one embodiment, the microlenses are collecting lenses (converging lenses), e.g., convex lenses.

In another embodiment, the microlenses are dispersing lenses, e.g., concave lenses.

A lens aperture of the microlenses may be circular, but may also (non-circular) elliptical. And also polygonal lens apertures or still other lens aperture geometries are possible, e.g., rectangular, in particular square ones, hexagonal ones or others. By choosing a suitable lens aperture geometry, it is possible to optimize (maximize) the percentage of light transmitted by and reflected by the MLA to finally contribute to the produced illumination pattern.

The fact that the structured light originates from an interference pattern created by interference of light propagating from different ones of the microlenses makes possible that the contrast of the structured light remains substantially constant over a wide range of distances from the MLA, usually in the whole far field, which is lat least from, e.g., 5 cm or 10 cm to infinity. The herein described apparatus does not require a patterned slide for achieving a patterned illumination. And also an imaging lens (or even a multi-lens imaging system) may be dispensed with.

The microlenses, i.e. their shape, define the field of view of the first optical arrangement, i.e. the angular range into which the structured light is (predominantly) emitted by the first optical arrangement (absence of additional optical components influencing the path of light emitted from the first optical arrangement assumed).

Therefore, for various applications, it can be advantageous to provide the microlenses as aspherical lenses. For example, the microlenses can be structured for creating a rectangular envelope for the structured light. E.g., the microlenses can have a focal length f1 along a first axis perpendicular to an optical axis of the microlens which is smaller than a focal length f2 along a second axis perpendicular to an optical axis of the microlens and perpendicular to the first axis.

Typically, the MLA is a two-dimensional MLA. But in some embodiments, the MLA is a one-dimensional MLA. In the latter case, the microlenses are arranged along a line; cylindrical lenses can in this case be particularly suitable.

In case of a two-dimensional MLA, there may be two lens pitches which may differ from each other, namely one pitch for each of two different directions. In case of rectangular lens arrangements, the two directions are mutually perpendicular, and for hexagonal arrangements, the directions enclose an angle of 60°. However, in some embodiments with a two-dimensional MLA, those two lens pitches are identical.

In one embodiment, the array of light sources (LSA) comprises light sources which are regularly arranged at a pitch Q (light source pitch Q).

Light source pitches Q are typically between 5 µm and 250 µm, more particularly between 10 µm and 150 µm.

Typically, the LSA is a two-dimensional LSA. But in some embodiments, the LSA is a one-dimensional LSA. In the latter case, the light sources are arranged along a line.

Usually, the light sources of the LSA are arranged on a common plate-shaped substrate, wherein an emission direction of the light sources (and thus the optical axis) is perpendicular to the plate described by the substrate.

In principle, pitch Q may be selected independent of lens pitch P. However, in case that both pitches P and Q are distances of microlenses and of light sources, respectively, positioned along lines which are parallel to each other, it turned out that particularly high contrasts in the structured light can be achieved if P=Q applies.

Good contrasts are also obtainable in case pP=qQ with p and q being integers of at least one (p≥1, q≥1) with no common factor. The inventors determined that in this case, illumination patterns can be produced which have an increased complexity, in particular an enlarged and more complex unit cell (with respect to the case of P=Q).

However, relatively high values of p and q tend to result in decreased contrast in the structured light, such that p≤8 and q≤8 is often favorable.

Typically, the microlenses of the LMA are arranged on a rectangular grid, or even on a square grid, but also other geometries are possible, e.g., a hexagonal periodic arrangement.

Typically, the light sources of the LSA are arranged on a rectangular grid, or even on a square grid, but also other geometries are possible, e.g., a hexagonal periodic arrangement.

The inventors discovered that the provision of an MLA and an LSA both having regular arrangements of the same geometry which are aligned parallel to each other may make possible to achieve particularly high contrasts, e.g., the provision of rectangular arrangements of the same aspect ratio for both, the MLA and the LSA, corresponding sides of the rectangles of the MLA and of the LSA being aligned parallel to each other.

Similarly, mutually parallel arranged hexagonal (or other) geometries of the microlens array and of the array of light sources tend to provide increased contrast.

In particular, for the above-mentioned case of pP=qQ (with integers p, q having no common factor), useful illumination patterns having a large unit cell and a large periodicity can be obtained. Analogously, the same holds for the case that there are two potentially different pitches (P1, P2) of the lenses along different axes and two potentially different pitches (Q1, Q2) of the light sources along different axes, at least if it is provided that p1P1=g1Q1 and p2P2=q2Q2, with integers p1, q1 having no common factor and integers p2, q2 having no common factor; and more particularly wherein the axis along which the lenses have pitch P1 is aligned parallel to the axis along which the light sources have pitch Q1, and wherein the axis along which the lenses have pitch P2 is aligned parallel to the axis along which the light sources have pitch Q2.

The inventors determined that the position of potential (i.e. possible) light intensity maxima in the produced illumination pattern is determined by the periodicity (or peridicities) of the MLA, while the periodicity (or periodicities) of the LSA can be used for adjusting relative intensities at said positions of potential light intensity maxima in the illumination pattern.

In one embodiment, the illumination unit is structured and configured for emitting spatially incoherent light. It is, alternatively, also possible to provide that the illumination unit emits spatially coherent light.

For example, the light sources may be light generators which are separate from each other (and, altogether, produce spatially incoherent light)—in contrast, e.g., to the provision of only one light generator such as one laser, plus a grating, the laser illuminating the grating and the light emitted through slits of the grating constituting the light sources (which results in spatially coherent light being emitted from the illuminating unit).

In one embodiment, the illuminating unit comprises an array of VCSELs, i.e. of vertical-cavity surface-emitting lasers. An array of VCSELs can make possible the emission of spatially incoherent light at very high intensity. In particular, it can be provided that the illuminating unit is an array of VCSELs.

The provision of VCSELs as light emitters can make possible the design of apparatuses which are very small-sized in the vertical direction, i.e. along the optical axis, along the emission direction. And small pitches Q are also easier to realize using VCSEL than using edge-emitting lasers.

In one embodiment, an emission direction of the VCSELs of the array of VCSELs is parallel to an optical axis of the MLA.

In one embodiment, a light path between the illuminating unit and the MLA is free of additional optical elements, at least free of optical elements having optical power.

In one embodiment, a reference plane at the MLA for determination of the distance D is referred to as lens plane, wherein the lens plane comprises peripheral points of the microlenses. In case not all peripheral points of the microlenses are in the same plane, the lens plane is defined as that plane comprising peripheral points of the microlenses which is farest away from the illumination unit.

In practice, the distances D are typically so much larger than a vertical extension (extension along the optical axis) of the microlenses that it is sufficiently precise to define the lens plane as the plane in which the microlenses are located.

Of course, the distance D is always determined in a direction perpendicular to the MLA—which in particular will usually also be a direction perpendicular to the above-mentioned emission plane.

In one embodiment, each of the light sources is structured and arranged to illuminate a set of said multitude of microlenses, the set comprising a plurality of neighboring microlenses. This way, it may be ensured that light from a single one of the light sources results in light propagating from several (different) ones of the microlenses, such that an interference pattern evolves. E.g., each microlens may be illuminated by at least two or rather at least ten of the light sources.

And moreover, it can be provided that sets of microlenses illuminated by neighboring ones of the light sources are overlapping, i.e. the set of microlenses illuminated by a first light source and the set of microlenses illuminated by a second light source neighboring the first light source have at least one microlens in common. Such an overlap on the MLA of light emitted from neighboring light sources can, in particular when lasers such as VCSELs are used as light sources, reduce or even eliminate speckle formation in a pattern produced by the structured light, i.e. in the illumination pattern. Typically, each of the light sources has an emission cone of at least 5° or rather at least 10° average opening angle ("average" for the case that the emission cones are not rotationally symmetric).

In order to produce structured light of a more complex composition, so as to produce more complex illumination patterns, it is possible to apply various variations to the described apparatus. In particular, it is possible to combine two or more optical arrangements of the described kind in a single apparatus. E.g., two or three arrangements may be combined, or four arrangements, e.g., each located on a corner of a rectangle may be combined.

In one embodiment, the apparatus comprises a second optical arrangement which comprises
- a second microlens array (second MLA) comprising a multitude of transmissive or reflective second microlenses which are regularly arranged at a lens pitch P2;
- a second illumination unit (second LSA) for illuminating the second microlens array;

the second illumination unit comprising a second array of light sources for emitting light of a wavelength L2 each and having an aperture referred to as second aperture each, wherein the second apertures are located in a common plane referred to as second emission plane which is located at a distance D2 from the second microlens array, wherein for the lens pitch P2, the distance D2 and the wavelength L2 applies $$(P2)^2 = 2 * L2 * D2 / N2$$

wherein N2 is an integer with N2≥1, and wherein the second microlens array is different from the microlens array of the first optical arrangement; or
  the second illumination unit is different from the illumination unit of the first optical arrangement; or
  both, the second microlens array is different from the microlens array of the first optical arrangement, and the second illumination unit is different from the illumination unit of the first optical arrangement.

In some instances in the following,
  the MLA of the first optical arrangement will be referred to as first MLA; and
  the LSA of the first optical arrangement will be referred to as first LSA; and
  the microlenses of the first optical arrangement will be referred to as first microlenses; and
  the light sources of the first optical arrangement will be referred to as first light sources; and
  the apertures of the first light sources will be referred to as first apertures; and
  lens pitch P is referred to as lens pitch P1; and
  wavelength L is referred to as wavelength L1; and
  distance D is referred to as distance D1; and
  integer N is referred to as integer N1.

In one embodiment, the second MLA is not identical to the first MLA and is shifted with respect to the first MLA. In this embodiment, the first and second MLAs are optionally congeneric MLAs. And furthermore optionally, the distances D1, D2 are identical. The first LSA may be identical with the second LSA or may be different from the second LSA, and it is possible that the first and the second LSA share a common set of their light sources. Optionally, wavelengths L1, L2 are identical in this embodiment.

Typically, in this embodiment, the first and second MLAs have optical axes which are parallel to each other and which are parallel to emission directions of the first and second LSAs.

Both, first and second MLA may be comprised in a single optical component.

In another embodiment, the lens pitches P1 and P2 are different from each other. In this case, it is possible to provide that distances D1 and D2 are identical. This may be accomplished by providing, e.g., that wavelength L1, L2 and/or integers N1, N2 are selected accordingly. However, typically, distances D1 and D2 are not identical. And typically, light source pitches Q1, Q2 at which the first and second light sources, respectively, are arranged, are in this embodiment different from each other.

In yet another embodiment, the wavelengths L1 and L2 are different from each other. In this case, typically, distances D1 and D2 are different from each other, too, and/or lens pitches P1, P2 are different from each other, too.

In yet another embodiment, the first and second MLAs are rotated with respect to each other. More particularly, both, the first MLA and the second MLA are of rectangular geometry (this includes also the case of square geometry) with two mutually perpendicular symmetry axes each, and the symmetry axes of the second MLA are at an angle φ with the symmetry axes of the first MLA for which applies 0°<φ≤45°, in particular 1°<φ≤10°. Similarly, also two MLAs of hexagonal geometry may be rotated with respect to each other.

It is also possible to obtain structured light producing more complex patterns without having to provide an additional MLA and/or LSA. E.g., the first optical arrangement may comprise an additional optical component, in particular an additional optical component comprising at least one prism. The additional optical component may be an array of passive optical components, e.g., a prism array.

Typically, the MLA is arranged (on the light path) between the LSA and the additional optical component.

The additional optical component can in particular be a prism array. The prism array comprises a multitude of prisms and may be comprised in a single optical component, e.g., manufactured using a replication process such as injection molding or embossing. E.g., the prism array may be plate-shaped and arranged parallel to the MLA.

Of course, the above refinements for producing patterned illumination of increased complexity may be pairwise combined or combined in groups of three or more. E.g., the provision of the additional optical component may be combined with one or more of the embodiments in which a second MLA and/or a second LSA is provided.

Structured light of increased complexity and, more particularly, more complex patterns produced by the apparatus may simplify a three-dimensional analysis of a scene illuminated by the structured light. More specifically, it may simplify the determination of distances from the apparatus to different portions of the scene.

The described apparatuses can also be considered pattern projectors or optical projection systems or optical apparatuses for projecting a light pattern into a field of view.

Further embodiments and advantages emerge from the dependent claims and the figures.

Figure 10:
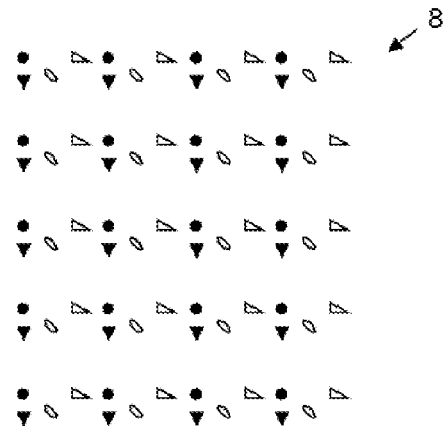
Figure 9:
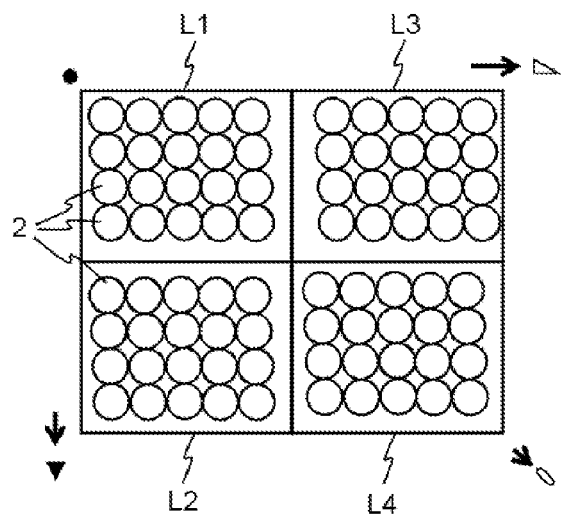
Figure 11:
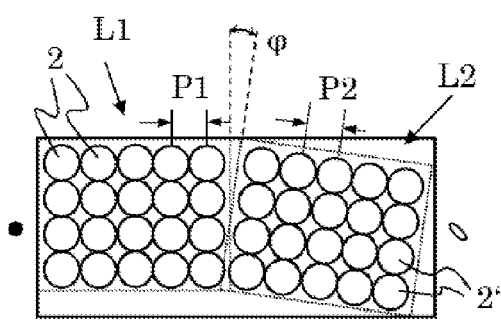
Figure 12:
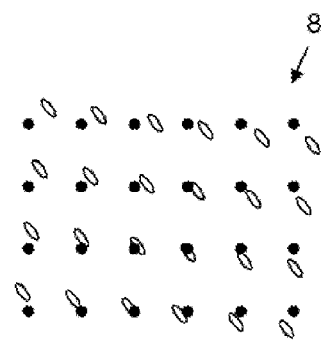
Figure 13:
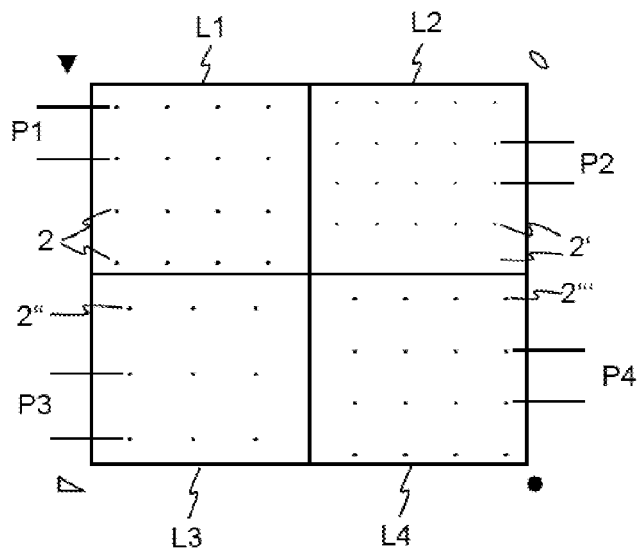
Figure 14:
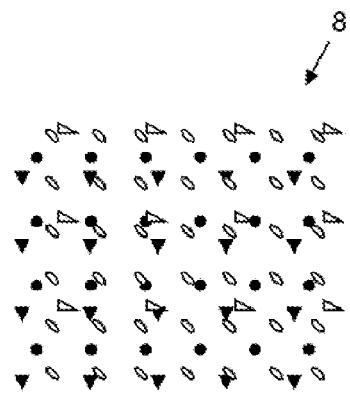
Figure 15:
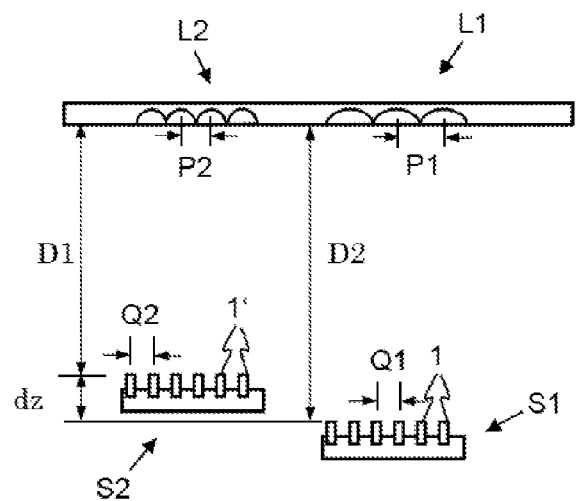
Figure 16:
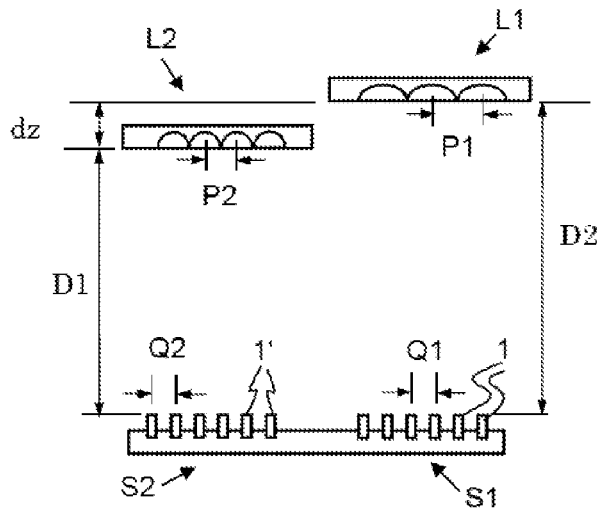
Figures 17, 18:
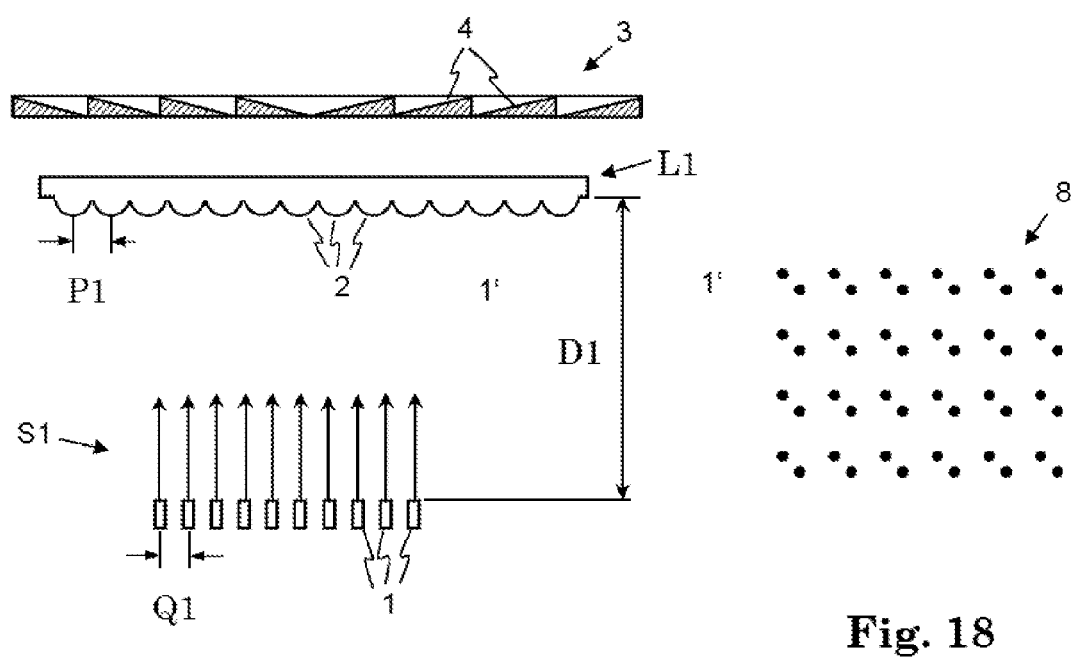

Below, the invention is described in more detail by means of examples and the included drawings. The figures show schematically:

FIG. 1 an illustration of an apparatus for producing structured light, in a side view;

FIG. 2 an illustration of a pattern created by structured light produced by the apparatus of FIG. 1;

FIG. 3 a graph illustrating contrast in patterns obtained for different numbers N1;

FIG. 4 an illustration of an apparatus for producing structured light, to scale, in a side view;

FIG. 5 an illustration of an MLA and an LSA, in a top view;

FIG. 6 an illustration of an MLA and an LSA, in a top view;

FIG. 7 an illustration of an alternative LSA to the LSA in FIG. 6, in a top view;

FIG. 8 an illustration of an apparatus for producing structured light of increased complexity, in a side view;

FIG. 9 an illustration of MLAs according to FIG. 8, in a top view;

FIG. 10 an illustration of a pattern created by structured light produced by the apparatus of FIG. 8;

FIG. 11 an illustration of MLAs for producing structured light of increased complexity, in a top view;

FIG. 12 an illustration of a pattern created using the MLAs of FIG. 11;

FIG. 13 an illustration of MLAs for producing structured light of increased complexity, in a top view;

FIG. 14 an illustration of a pattern created using the MLAs of FIG. 13;

FIG. 15 an illustration of an apparatus for producing structured light of increased complexity using MLAs of FIG. 13, in a side view;

FIG. 16 an illustration of an alternative apparatus for producing structured light of increased complexity using MLAs of FIG. 13, in a side view;

FIG. 17 an illustration of an apparatus for producing structured light of increased complexity using a prism array, in a side view;

FIG. 18 an illustration of a pattern created using the apparatus of FIG. 17.

The described embodiments are meant as examples or for clarifying the invention and shall not limit the invention.

FIG. 1 shows a schematic illustration of an apparatus for producing structured light 5, in a side view. At the same time, FIG. 1 shows a schematic illustration of an optical arrangement for producing structured light 5. The apparatus (and the optical arrangement) comprises a microlens array L1 (MLA L1) comprising a multitude of microlenses 2 which are regularly arranged at a pitch P1. Typically, the microlenses 2 are congeneric microlenses. The apparatus also comprises an array S1 of light sources (LSA S1) by means of which MLA L1 is illuminated. LSA S1 comprises a multitude of light sources 1 which are regularly arranged at a pitch Q1. Typically, the light sources 1 are congeneric light sources. And usually, light emitted from the light sources 1 travels on a light path to the MLA L1 which is free of any intervening surface having optical power.

In the illustrated case of FIG. 1 and also in most other Figures, the microlenses 2 are transparent refractive semi-concave microlenses. However, the microlenses 2 may alternatively be concave microlenses or convex microlenses of semi-convex microlenses. And they may furthermore alternatively be diffractive microlenses or diffractive-and-refractive microlenses, the latter also being referred to as hybrid microlenses. And the microlenses 2 may also be reflective microlenses. In the latter case, the structured surface of the microlens reflects light impinging on it.

In the illustrated case of FIG. 1 and also in most other Figures, only a small number of microlenses 2 is illustrated. However, in practice many more microlenses may be provided. and the same holds also for the relative small number of illustrated light sources drawn.

In particular, LSA S1 can be an array of VCSELs, such that each of the light sources 1 is a VCSEL.

Light sources 1 emit light of a wavelength L (not indicated in the Figures) into an emission cone each, as indicated in FIG. 1, wherein the cones may have a circular cross-section but do not need to have a circular cross-section. Opening angles of the cones are typically between 2° and 120° or rather between 5° and 25°, e.g., about 10°. The emission cones are not free from overlap, as can be seen in FIG. 1 (dashed lines). The emission cones overlap, typically at least for immediately adjacent light sources 1, and optionally rather, each microlens 2 is illuminated by at least 6 light sources 1.

Light sources 1 may in particular emit infrared light.

Each light source 1 illuminates several ones of the microlenses 2.

This way, light emitted from a specific light source 1 but having passed through different ones of the microlenses 2 can interfere so as to produce an interference pattern. Light emitted from another one of the light sources 1 produces, in the same way, the same interference pattern, such that, in the far field, e.g., beyond 2 cm or beyond 5 cm after having interacted with MLA L1, all the interference patterns superimpose. This way, the structured light 5 produces a high-intensity interference pattern which can be used to illuminate a scene or be caught on a screen.

Manufacture of an apparatus of the described kind is simplified by the fact that no precision lateral alignment of MLA L1 and LSA S1 is necessary for producing high-contrast illumination patterns. The x-y-tolerance (shifts in a plane parallel to the MLA plane/emission plane) is very high; z tolerances (distance between MLA and illumination unit) are relative loose; and also rotational alignment requirements are not very high.

A distance between LSA S1 (and, more particularly the light sources 1) and MLA L1 (and, more particularly the microlenses 2) is referred to as D1.

FIG. 2 is a schematic illustration of a pattern 8 created by structured light 5 produced by the apparatus of FIG. 1. The pattern 8 is recorded in the far-field. The dark spots indicate locations of high light intensity, whereas white area indicates regions of low light intensity.

It turned out that for specific selections of pitches P1, wavelengths L1 and distances D, a contrast present in such a pattern is particularly high, whereas for other distances, only much lower contrast is present in a created pattern.

A formula in which the decisive magnitudes P1, L1 and D1 are interconnected so as to obtain triplets P1, L1, D1 for which particularly sharp contrast in patterns 8 is obtained reads as follows:

$$(P1)^2 = 2*(L1)*(D1)/(N1).$$

Therein, N1 designates an integer which is at least 1. I.e. for N1=1 or 2 or 3 or 4, . . . , triplets P1, L1, D1 can be selected which fulfill the above equation, and thus, the parameters for an apparatus for high-contrast pattern generation are determined.

FIG. 3 shows a graph illustrating contrast in patterns 8 obtained for different numbers N1, wherein in the graph of FIG. 3, N1 is a continuous positive number, assigned to the horizontal axis. Along the vertical axis, a magnitude indicative of the contrast obtained in a pattern 8 is indicated.

As is obvious from FIG. 3 (cf. the small arrows), particularly high contrast is present if N1 is an integer. N1=2 promises highest contrast, and in the case of N1 being 1 or 3 or 4, also very high contrast patterns can be obtained. For higher integers N1, still a high contrast is obtained, which is clearly higher than contrast for non-integer numbers in between. However, illumination patterns may also be produced for non-integer factors instead of integer N, e.g., for 0.5 or 1.5.

If P1 and L1 are given (fixed), N1=1 results in a small value for D1 such that the apparatus can be rather shallow, i.e. small in the direction of light emission.

FIG. 4 is an illustration to scale and in a side view, of an apparatus for producing structured light. FIG. 4 illustrates, e.g., the case of P1=Q1=50 nm for N1=2 and L1=833 nm. The far-field in which the pattern 8 can be observed and recorded is much too far away to be illustrated in FIG. 4.

LSA S1 does not have to, but may be a regular array. And it turned out that particularly high contrast patterns can be obtained when MLA L1 and LSA S1 are mutually parallel arrays of the same geometry, wherein P1=Q1 applies. And still very high contrast patterns can be achieved if P1/Q1 amounts to 2 or 3 or 4 or to 3/2 or 4/3 or 5/2 or 5/4 or if Q1/P1 amounts to 2 or 3 or 4 or to 3/2 or 4/3 or 5/2 or 5/4. In fact, for p1P1=q1Q1 (with p1≥1 and q1≥1, p1 and q1 designating integers), illumination patterns can be produced which have an increased complexity, in particular illumination patterns which have a larger unit cell, and wherein the larger unit cell is repeated with a larger periodicity—than compared to the case P1=Q1.

MLA L1 and/or LSA S1 may be one-dimensional (i.e. linear) arrays, but for many applications, MLA L1 and/or LSA S1 are two-dimensional (i.e. aerial) arrays.

FIG. 5 is a schematic illustration of a top view of an MLA L1 and an LSA S1, which can be used for high-contrast pattern generation, wherein MLA L1 and also LSA S1 have, in both lateral directions (x and y; in contrast to z which is along the optical axes of the microlenses and typically also along the light emission direction of the light sources), the same pitch P1 and Q1, respectively. Furthermore, in FIG. 5 applies P1=2Q1.

FIG. 6 is a schematic illustration in a top view of an MLA L1 and an LSA S1, which can be used i for high-contrast pattern generation, wherein both, MLA L1 and LSA S1, have different pitches in x- and y-directions, wherein in particular P1x=2P1y and Q1x=2Q1y applies.

And furthermore, in FIG. 6, P1x=Q1x and P1y=Q1y applies. However, as indicated above, this does not have to be the case. FIG. 7 is an illustration of an alternative LSA S1 to the LSA S1 in FIG. 6, in a top view, wherein P1x=Q1x and 2P1y=Q1y applies.

FIG. 6 further illustrates that not only rotationally symmetric microlenses 2, but also aspheric microlenses 2 may be provided in MLA L1. Aspheric microlenses may be (but do not have to be) arranged in a pattern with different pitches P1x, P1y in different directions, as illustrated in FIG. 6, which can make possible to use most of the light emitted by LSA S1.

The shape of the microlenses determines the field of view of the apparatus, i.e. the angular range into which the structured light is emitted. For various applications, it may be desirable to illuminate a non-circular area, e.g., a rectangular area. In such cases, it can be advantageous to create an approximately rectangular field of view, because then, the light intensity produced by the light sources can be made use of more efficiently, since then, no (or only little) intensity is emitted into undesired directions (outside the desired field of view). Aspheric lenses are well suited for creating tailored fields of view.

The high-contrast patterns described so far are usually very simple patterns having a small unit cell. However, for some applications, it can be advantageous to create more complex patterns and patterns having larger unit cells, respectively.

FIG. 8 is a schematic illustration in a side view of an apparatus for producing patterned illumination of increased complexity. In this case, the apparatus comprises at least two optical arrangements for producing structured light, a first of the arrangements comprising a first MLA L1, a second of the arrangements comprising a second MLA L2. All arrangements may share, at least in part, one LSA, as illustrated in FIG. 8 in which at least a portion of the light sources 1 illuminates at least two MLAs.

MLA L1 and MLA L2 are shifted with respect to each other by a distance dy. Such a shift can translate into a superposition of mutually shifted illumination patterns produced by the structured light of the apparatus, each optical arrangement producing one pattern. FIG. 10 is a schematic illustration of a pattern 8 created by structured light produced by the apparatus according to FIGS. 8 and 9.

FIG. 9 is a schematic illustration of MLAs according to FIG. 8, in a top view. While in FIG. 8 only two MLAs (MLA L1, MLA L2) are visible, FIG. 9 shows that, e.g., four MLAs (L1, L2, L3, L4) can be comprised in the apparatus, and accordingly, the apparatus comprises four optical arrangements. As suggested in FIG. 8, all four optical arrangements may share, at least in part, one LSA S1.

In the corners of FIG. 9, the shifts are symbolized by arrows, and the symbols used in FIG. 10 for illustrating which portion of the illustrated pattern 8 originates from which MLA are illustrated there, too. The shape and visual appearance of the symbols is not related to the shape or visual appearance of structures in the pattern 8. They merely indicate locations of high intensity in the illumination pattern.

In FIGS. 8-10, it is assumed that P1=P2=Q1. But this does not need to be the case.

The above-cited equation, however, is, of course, assumed to be valid for each optical arrangement.

FIG. 11 shows a schematic illustration in a top view of MLAs L1, L2 for producing structured light of increased complexity. In this case, principal axes of the MLAs L1 and L2 are rotated with respect to each other by an angle φ (in the lateral plane, the x-y plane). Angle φ is typically smaller than 12°, e.g., smaller than 6°. However, virtually any angle φ may be used.

Two LSAs are typically used together with the two mutually rotated MLAs. And each of the LSAs is typically aligned parallel to its associated MLA.

FIG. 12 is a schematic illustration of a pattern 8 created using the MLAs L1, L2 of FIG. 11.

Of course, further MLAs and LSAs and thus, further optical arrangements, may be comprised in the apparatus.

On the sides of FIG. 11, the symbols used in FIG. 12 for illustrating, in the same way as FIG. 10, which portion of the illustrated pattern 8 originates from which MLA are illustrated.

In FIGS. 11, 12, it is assumed that P1=P2=Q1. But this does not need to be the case.

The above-cited equation, however, is, of course, assumed to be valid for each optical arrangement.

Still another way of creating more complex light patterns is illustrated in FIGS. 13-16. In this case, complex unit cells are created by selecting at least two, e.g., four, MLAs which have different lens pitches.

FIG. 13 is a schematic illustration in a top view of MLAs L1, L2, L3, L4 for producing structured light of increased complexity by providing four different lens pitches P1, P2, P3, P4. The microlenses are referenced 2, 2', 2", 2'" for the different MLAs.

In the same way as in FIG. 10 with relation to FIG. 8, FIG. 14 symbolically illustrates a pattern 8 obtainable using MLAs as illustrated in FIG. 13.

FIGS. 15 and 16 show schematic illustrations in a side view of apparatuses for producing structured light of increased complexity using MLAs of FIG. 13.

In order to fulfill the above-cited equation for all four optical arrangements (and assuming the same integers N1=N2=N3=N4 and the same wavelengths L1=L2=L3=L4), distances D1, D2 (and D3 and D4) have to be different. This is exemplarily illustrated by a difference distance dz.

In FIG. 15, the MLAs share a common lens plane. Accordingly, the LSAs may have different emission planes to satisfy the above-cited equation. The distances D1, D2, D3, D4 are the distances between the common lens plane and the emission plane of respective LSA.

In FIG. 16, the LSAs share a common emission plane. Accordingly, the MLAs may have different lens planes to satisfy the above-cited equation. The distances D1, D2, D3, D4 are the distances between the common emission plane and the lens plane of the respective MLA.

It is possible to realize an apparatus described in FIGS. 13 and 14 in such a way that all emission planes coincide with a common emission plane and that all lens planes coincide with a common lens plane. This can be accomplished by suitably selecting the integers N1, N2, N3, N4 and/or the wavelengths L1, L2, L3, L4 emitted by the light emitters 1, 1' . . . of the respective LSAs S1, S2, . . . .

Still another way of creating complex illumination patterns is illustrated in FIGS. 17, 18. In this case, an additional optical component, e.g., an array of passive optical components, is inserted in the light path (between the MLA and the scene).

FIG. 17 is a schematic illustration of a side view of an apparatus for producing structured light of increased complexity using a prism array 3. The prism array comprises a multitude of prisms 4. By the prisms 4, light from the MLA L1 is redirected, so as to create a superposition of patterns.

FIG. 18 is a schematic illustration of a pattern created using the apparatus of FIG. 17.

The additional optical component such as the prism array 3 may be realized in a single-piece optical component together with the MLA (or MLAs in case two or more would be provided).

Also in those apparatuses which comprise two or more MLAs (cf., e.g., FIGS. 9, 13), all the MLAs may be realized in a single-piece optical component.

A single-piece optical component may be produced, e.g., by a replication technique such as by injection molding or embossing, or by replicating the MLAs and/or further optical components on one side or on two sides of a substrate plate such as on a glass plate.

Despite various of the Figures suggesting that lens apertures of the illustrated lenses are circular, it is well possible to use MLA with microlenses having other lens apertures, e.g., polygonal ones.

Of course, the various ways of making the structured light and the producible patterns more complex may be combined with each other.

Other implementations are within the scope of the claims.

What is claimed is:

1. An apparatus for producing structured light, the apparatus comprising a first optical arrangement comprising:
a microlens array comprising a multitude of transmissive or reflective microlenses which are regularly arranged at a lens pitch P; and
an illumination unit for illuminating the microlens array; the illumination unit comprising an array of light sources for emitting light of a wavelength L each and having an aperture each, wherein the apertures are located in a common emission plane which is located at a distance D from the microlens array, wherein $$P^2=2LD/N,$$

and wherein N is an integer with N≥1,
wherein each of the light sources is arranged to illuminate a respective subset of the multitude of microlenses, each of the subsets comprising a plurality of neighboring microlenses, such that light from each particular one of the light sources passes through different ones of the microlenses in the respective subset so as to produce an interference pattern.

2. The apparatus according to claim 1, wherein the microlenses are aspherical microlenses.

3. The apparatus according to claim 1, wherein the microlens array is a two-dimensional microlens array.

4. The apparatus according to claim 1, wherein the array of light sources is a two-dimensional array of light sources.

5. The apparatus according to claim 1, wherein the illumination unit is structured and configured to emit spatially incoherent light.

6. The apparatus according to claim 1, wherein the array of light sources comprises an array of vertical-cavity surface-emitting lasers.

7. The apparatus according to claim 1, wherein the light sources of the array are regularly arranged at a light source pitch Q, wherein P=Q.

8. The apparatus according to claim 7, wherein an axis along which the microlenses are arranged at the pitch P is aligned parallel to an axis along which the light sources are arranged at the pitch Q.

9. The apparatus according to claim 1, wherein the light sources of the array are regularly arranged at a light source pitch Q, wherein for P and Q applies pP=qQ, wherein p and q are integers having no common factor, with p≥1 and q≥1.

10. The apparatus according to claim 9, wherein an axis along which the microlenses are arranged at the pitch P is aligned parallel to an axis along which the light sources are arranged at the pitch Q.

11. The apparatus according to claim 1, wherein the apparatus comprises a second optical arrangement comprising:
a second microlens array comprising a multitude of transmissive or reflective second microlenses which are regularly arranged at a lens pitch P2; and
a second illumination unit for illuminating the second microlens array;
the second illumination unit comprising a second array of light sources for emitting light of a wavelength L2 each and having an aperture referred to as second aperture each, wherein the second apertures are located in a common plane referred to as second emission plane which is located at a distance D2 from the second microlens array, wherein $$(P2)^2=2*L2*D2/N2,$$

and wherein N2 is an integer with N2≥1, and wherein
the second microlens array is different from the microlens array of the first optical arrangement; or the second illumination unit is different from the illumination unit of the first optical arrangement; or both, the second microlens array is different from the microlens array of the first optical arrangement, and the second illumination unit is different from the illumination unit of the first optical arrangement.

12. The apparatus according to claim 11, wherein the second microlens array is different from the microlens array of the first optical arrangement, and wherein the second microlens array is shifted with respect to the microlens array of the first optical arrangement in a direction parallel to the emission plane.

13. The apparatus according to claim 11, wherein the lens pitches P1 and P2 are different from each other.

14. The apparatus according to claim 11, wherein the wavelengths L1 and L2 are different from each other.

15. The apparatus according to claim 11, wherein the second microlens array is rotated with respect to the microlens array of the first optical arrangement.

16. The apparatus according to claim 15, wherein the second microlens array and the microlens array of the first optical arrangement are both of rectangular geometry having two mutually perpendicular symmetry axes each, and wherein an angle φ between the symmetry axes of the second microlens array and the symmetry axes of the microlens array of the first optical arrangement amounts to at least 1° and to at most 20°.

17. The apparatus according to claim 11, wherein the second microlens array and the microlens array of the first optical arrangement are embodied in a single-piece optical component.

18. The apparatus according to claim 1, wherein the optical arrangement comprises an additional optical component, wherein the microlens array is arranged between the illumination unit and the additional optical component.

19. The apparatus according to claim 18, wherein the additional optical component comprises at least one prism.

20. The apparatus according to claim 18, wherein the additional optical component comprises a prism array.

21. The apparatus according to claim 1, wherein the structured light originates from the interference patterns.

22. The apparatus according to claim 1, wherein respective subsets illuminated by neighboring ones of the light sources are partially overlapping.

23. The apparatus according to claim 1, wherein each of the light sources emits the light of the wavelength L into an emission cone having a circular or non-circular cross-section, wherein the emission cones of immediately adjacent light sources are partially overlapping.

24. An apparatus for producing structured light, the apparatus comprising an optical arrangement comprising:

a first microlens array comprising a multitude of transmissive or reflective microlenses which are regularly arranged at a lens pitch P1;

a second microlens array comprising a multitude of transmissive or reflective microlenses which are regularly arranged at a lens pitch P2; and an illumination unit for illuminating the first microlens array and the second microlens array;

the illumination unit comprising:

a first array of light sources for emitting light of a wavelength L1 each and having an aperture each, wherein the apertures are located in a common first emission plane which is located at a distance D1 from the first microlens array, wherein $(P1)^2 = 2*(L1)*(D1)/(N1)$, and wherein N1 is an integer with N≥1; and a second array of light sources for emitting light of a wavelength L2 each and having an aperture each, wherein the apertures are located in a common second emission plane which is located at a distance D2 from the first microlens array, wherein $(P2)^2 = 2*(L2)*(D2)/(N2)$, and wherein N2 is an integer with N≥1.

25. The apparatus according to claim 24, wherein the first array of light sources is one and the same as the second array of light sources.

26. The apparatus according to claim 24, wherein the first array of light sources is different from the second array of light sources.

27. The apparatus according to claim 26, wherein distance D1 is different from distance D2.

28. The apparatus according to claim 26, wherein wavelength L1 is different from wavelength L2.

29. The apparatus according to claim 24, wherein lens pitch P1 is different from lens pitch P2.

30. The apparatus according to claim 24, wherein the first emission plane is identical with the second emission plane.

* * * * *